United States Patent [19]

Cheng et al.

[11] Patent Number: 5,043,872
[45] Date of Patent: Aug. 27, 1991

[54] ACCESS PATH OPTIMIZATION USING DEGREES OF CLUSTERING

[75] Inventors: Josephine M. Cheng, San Jose; Akira Shibamiya, Los Altos; Yun Wang, Sunnyvale, all of Calif.

[73] Assignee: International Business Machines Corporation, Armonk, N.Y.

[21] Appl. No.: 219,622

[22] Filed: Jul. 15, 1988

[51] Int. Cl.$^5$ .................. G06F 15/74; G06F 15/21; G06F 15/403; G06F 12/06
[52] U.S. Cl. .................. 364/200; 364/931.46; 364/962.1; 364/962.2; 364/962.4; 364/963; 364/963.4; 364/974.4; 364/974.6; 364/225.3; 364/282.3; 364/282.4; 364/283.1; 364/283.4
[58] Field of Search ... 364/200 MS File, 900 MS File

[56] References Cited

U.S. PATENT DOCUMENTS

| | | | |
|---|---|---|---|
| 4,631,673 | 12/1923 | Haas et al. | 364/300 |
| 4,769,772 | 9/1988 | Dwyer | 364/300 |
| 4,805,134 | 2/1989 | Calo et al. | 364/900 |
| 4,817,050 | 3/1989 | Komatsu et al. | 364/900 |

OTHER PUBLICATIONS

D. Maio et al., "On Estimating Access Costs in Relational Databases", Information Processing Letters, 19, (1984), pp. 157-161.
Selinger et al., "Access Path Selection in a Relational Database Management System", IBM Research Report, RJ2429, (1/8/79).

Primary Examiner—Archie E. Williams, Jr.
Assistant Examiner—Ayni Mohamed
Attorney, Agent, or Firm—Pryor A. Garnett; George M. Knight

[57] ABSTRACT

This invention measures the degree of clustering of an index for a relational data base table, estimates the number of physical page accesses required to access the table using a partial index scan using the index, and selects the index providing the fastest access path to the table. The degree of clustering is measured as follows:

DC = Number of clustered rows (NCR)/Total rows (NR)

A multiplier greater than 1 can be applied to the degree of clustering to reflect the benefit of having consecutively accessed rows on adjacent or nearby data pages.

The degree of clustering so calculated is used to estimate the number of random and sequential page accesses required for a partial index scan. These numbers of accesses are then multiplied by the unit time required for each, and added to the total CPU processing time required to arrive at the estimated total time for the scan. The total time is calculated for each index which could be used as an access path for the query or other operation being optimized, and the index with the shortest overall time is selected as the access path.

11 Claims, 2 Drawing Sheets

ACCESS PATH OPTIMIZATION USING DEGREES OF CLUSTERING

BACKGROUND OF THE INVENTION

1. Technical Field

This invention relates to information management, and more particularly to data base management systems.

2. Description of the Prior Art

A data base management system is a computer system for recording and maintaining data. In a relational data base management system, data is stored as rows in a table, with collections of tables being called data bases. One can manipulate (select, update, insert, or delete) data by issuing a request or command (called a query) to the data base. In a relational data base management system's data query and manipulation language, such as SQL, requests are nonprocedural (also referred to as navigational). That is, users simply specify what is wanted, rather than specifying how to accomplish it. The system's optimizer must determine the optimal way (or access path) to get the data for the user. One way to access data is to sequentially scan every row in a table for those rows which match the search criteria. This is known as a table scan, because the entire table is scanned in sequence from beginning to end.

Rows of data are stored on pages on physical storage devices, usually disk drives or files. Data is transferred between the physical storage and the computer system's processing unit page by page even though only a single row may be needed from a given page. The time it takes to transfer data between physical storage and the processing unit is many times greater than the time it takes to process the data in the processing unit. Furthermore, the time it takes to randomly access separate physical pages is as much as ten times longer than the time needed to sequentially access adjacent pages. To manipulate data in a relational data base, the rows must first be transferred from physical storage to the processing unit, then processed in the processing unit, and finally transferred back to physical storage. Because transferring takes so much longer than processing, the total time required to manipulate the data can be dramatically reduced if the number of transfers can be reduced.

Most relational data base systems maintain indexes for their tables. An index is a list stored separately from the rows and used to access the rows in a selected order. An index comprises many index entries, each containing a key value and an identifier of or pointer to one or more rows which contain that key value. Indexes are physically stored on index pages.

One method of storing an index's pages is as a B-tree, with a root page, intermediate pages depending from the root, and leaf pages depending from the intermediate pages at the lowest level of the tree. The term B-tree is short for "balanced tree", and refers to the balanced or roughly equal number of pages to which each such root or intermediate index page points. The B-tree's leaf pages contain the index entries. To scan a table's rows in the order specified by the index, the index's leaf pages are scanned sequentially and the index entries on each leaf page are used to access the rows in the index's order. This scan is called an index sequential scan, or index scan for short.

In the prior art, there are two types of index organizations: perfectly clustered and nonclustered. An index is perfectly clustered if, when scanning the index leaf pages sequentially, each data page is accessed only once. For this to occur the data rows, when accessed in index order, must be in the same sequence as the sequence in which they are stored in the data pages of physical storage. An index scan through a clustered index (also referred to as a clustered index scan) is fast because the number of data page accesses is minimized since there are no duplicate accesses to the same data page and because both the index leaf pages and the data pages can be accessed sequentially rather than at random.

An index is nonclustered if, when scanning the index leaf pages sequentially, the data pages are accessed back and forth at random. Index scans through nonclustered indexes (also referred to as nonclustered index scans) are extremely slow, because there is much thrashing back and forth between data pages as the index requires separate data pages to be randomly accessed and transferred into and out of the processing unit's main memory but only accesses one row from the many on each such page.

When an index's key is used as a search criterion in a query, that index can often provide an efficient access path for identifying these data rows which satisfy or match the search criteria. When a complex query having several criteria is presented, the data base system's optimizer often has a number of indexes available, each having a key the same as one of the search criteria. The optimizer must then select the best index with which to access the data rows.

The prior art teaches the desirability of clustered index scans as access paths for queries. However until now physical clustering of data has been considered an all-or-nothing proposition. Without taking into account the degree of clustering, the optimizer cannot discriminate between relatively more or less clustered indexes, and may choose a less efficient access path, resulting in unnecessary physical data page accesses.

SUMMARY OF THE INVENTION

One object of this invention is to measure degrees of physical clustering of indexes.

Another object of this invention is to provide a method for using such degrees of clustering in selecting access paths for data base management systems.

Yet another object of this invention is to select access paths by accurately estimating the page accesses required during an index scan based on the degree of clustering of the index.

These and other objects are achieved by a method for estimating the number of data pages to be accessed during an index scan of a relational data base table. The method of this invention first calculates a clustering coefficient which is directly proportional to the number of rows which, when in index order, are in a sequence which is the same as the sequence in which they are stored on the data pages. This clustering coefficient is then used to estimate the number of pages to be accessed during the index scan. The number of page accesses may then be used to select an access path for a query, join, or other indexed data base operation.

The clustering coefficient is preferably calculated by multiplying the ratio of clustered rows to total rows by a factor which is greater than 1, in order to account for the advantage of accessing rows which are on nearby pages but not sequentially adjacent to each other.

DESCRIPTION OF THE PREFERRED EMBODIMENT

Clustered Indexes

Figure 1:
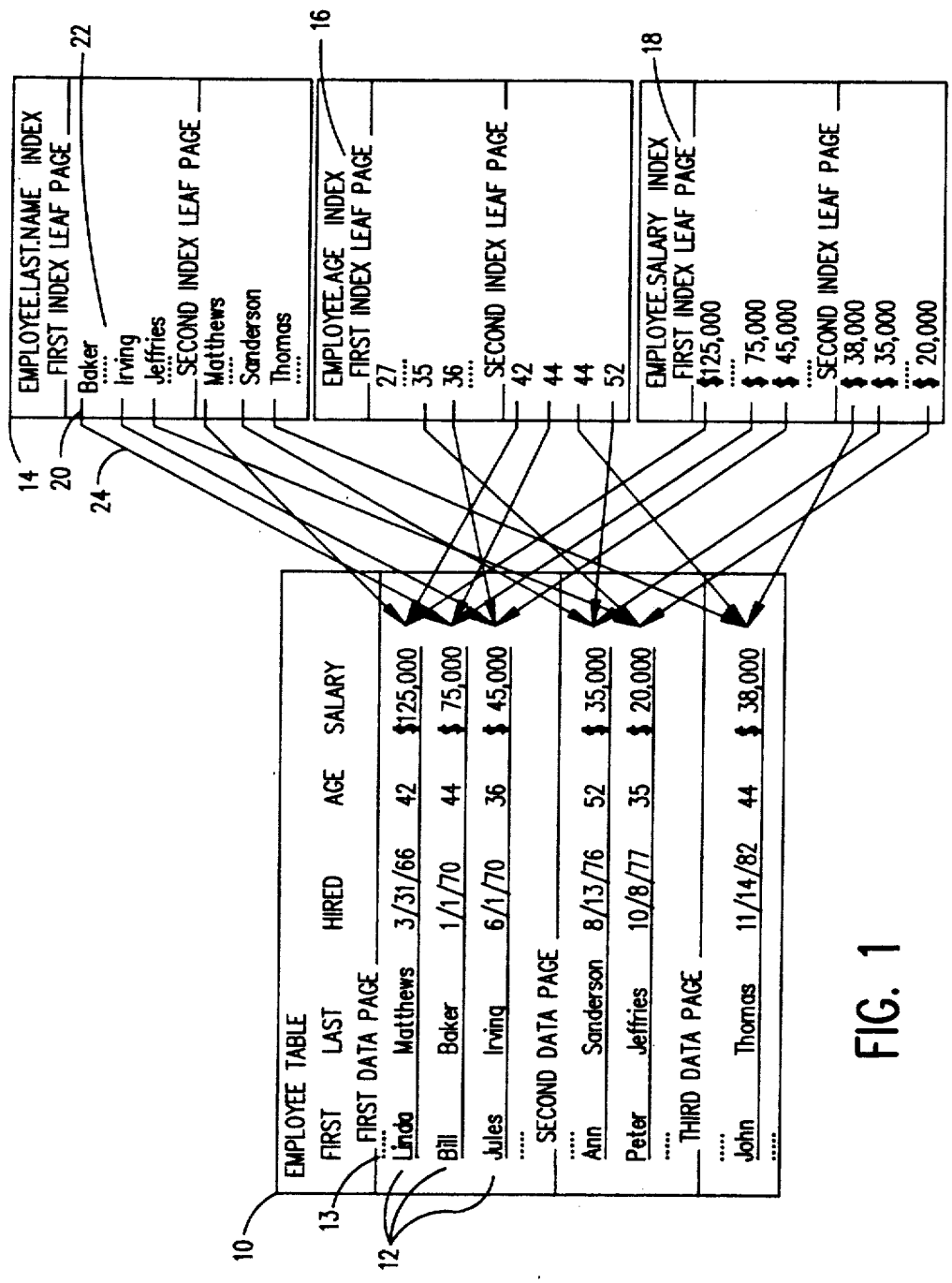
FIG. 1 shows an illustrative relational data base table EMPLOYEE having three indexes EMPLOYEE.LASTNAME, EMPLOYEE.AGE, and EMPLOYEE.SALARY, with varying degrees of clustering according to the invention.
Figure 2:
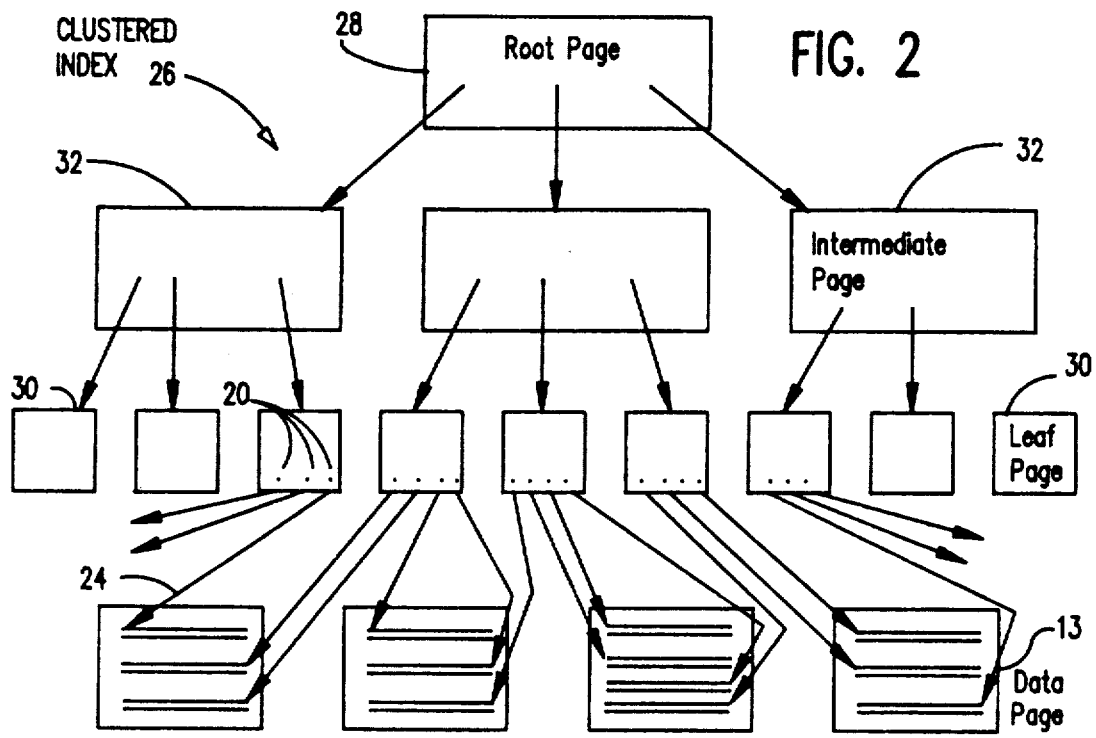
FIG. 2 shows a perfectly clustered B-tree index.
Figure 3:
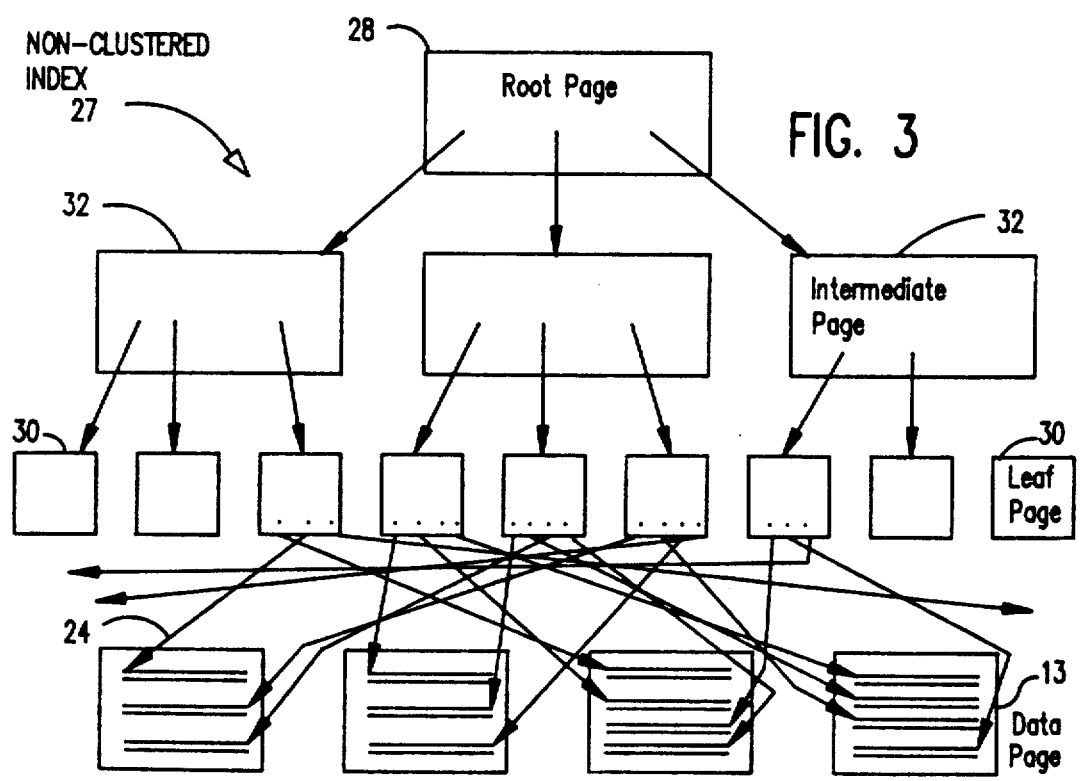
FIG. 3 shows a nonclustered B-tree index.

As seen in FIG. 1, a data base table 10 having rows 12 of employee data might be physically stored on data pages 13 in the order in which the employees were hired. Such a table 10 could have a first index 14 for placing the rows 12 in increasing (ascending) alphabetical order by last name, a second index 16 for placing the rows in ascending order by age, and a third index 18 for placing the rows in decreasing (descending) order by salary. Each index 14,16,18 comprises many index entries 20, each index entry containing a key value 22 (e.g., last name, age, or salary) and an identifier of or pointer 24 to one or more rows 12 which contain that key value. The indexes 14,16,18 are physically stored on index pages. FIG. 2 shows a perfectly clustered B-tree index 26. The root page 28 of the tree is at the top of the drawing, the leaf pages 30 are along the bottom, and intermediate pages 32 are interposed between the root and the leaves.

For purposes of understanding this invention, consider the following query applied to the employee table 10 of FIG. 1:

SELECT Last.names FROM Employee TABLE where Age >= 40 AND Salary <= $40,000.

This query requests the last names of all employees at least 40 years old and earning $40,000 or less. The conditions that age be greater than or equal to 40 and salary be less than or equal to $40,000 are the search criteria for this query. It will be seen from inspecting the employee table 10 that only Thomas and Sanderson satisfy both of these criteria.

The simplest access path by which the optimizer could determine which rows satisfy these search criteria is a table scan, i.e., a sequential scan through all of the rows 12 in the table 10 in the order in which they are stored, checking each row to determine whether it matches the search criteria. For the abbreviated employee table 10 of FIG. 1, a table scan would require transferring three data pages to and from main memory, and processing all six rows of the table. With a few assumptions, the time required to do this search can be estimated as follows. Each sequential access of a page requires about 2 milliseconds (2 ms), each random access requires 20 ms, and the processing of each row requires about 0.1 ms. Thus, the total time required for a table scan through the employee table 10 would be as follows:

| | | |
|---|---|---|
| Paging = | 3 pages @ 2 ms = | 6 ms |
| Processing = | 6 rows @ 0.1 ms = | 0.6 ms |
| Total = | | 2.6 ms |

The same query can be satisfied by performing a partial index scan using the Age index 16 to access only the rows meeting the search criterion Age >= 40. Using this access path, the Age index 16 would be searched for the first entry matching the age search criterion, i.e., the first entry equal to or greater than 40. An index scan would then be performed from that point in the index onward. The first data page would be randomly accessed and the Matthews row processed and discarded, followed by the third data page (again randomly) for the Thomas row, the first data page again for the Baker row, and finally the second data page for the Sanderson row. This is an example of a completely nonclustered index scan, in which each row identified by the index as meeting one of the search criteria requires a random page access for that row to be processed. The total cost of this nonclustered index scan is as follows:

| | | |
|---|---|---|
| Index paging = | 1 page @ 2 ms = | 2 ms |
| Data paging = | 4 pages @ 20 ms = | 80 ms |
| Processing = | 4 rows @ 0.1 ms = | 0.4 ms |
| Total = | | 82.4 ms |

A clustered index scan through a perfectly clustered index is not available as an option in this example. Neither of the indexes corresponding to the search criteria, the Age index 16 and the Salary index 18, is perfectly clustered. According to the prior art, then, either of these indexes would be equally efficient as an access path for this query and an optimizer using prior art methods of access path selection would make its choice accordingly.

It will be seen from inspection of FIG. 1 that the Salary index 18, while not completely clustered, is nearly so. An index scan through the Salary index 18 would be less time consuming, and therefore more efficient, than either the table scan through the entire employee table 10 or the index scan through the Age index 14, discussed above. Using the Salary index 18 as the access path for this query, the index would be scanned for the first entry matching the Salary search criterion, i.e., with a salary equal to or less than $40,000. The first such entry appears on the second index page of the Salary index 18. An index scan would then be performed through the remainder of this index, and each row identified by the index processed according to the query. Thus, the third data page would be transferred (random access) and the Thomas row processed and selected. Next, the second data page (again, random access) would be transferred, and the Sanderson row processed and discarded. Finally, the Jeffries row would be processed, which would not require accessing a data page since the Jeffries row is clustered next to the Sanderson row. The total cost of using the Salary index 18 as the access path is therefore:

| | | |
|---|---|---|
| Index paging = | 1 page @ 2 ms = | 2 ms |
| Data paging = | 1 page @ 20 ms + | |
| | 1 page @ 20 ms = | 40 ms |
| Processing = | 3 rows @ 0.1 ms = | 0.3 ms |
| Total = | | 42.3 ms |

Thus, the relatively clustered Salary index 18 provides a much better access path for this sample query than the completely nonclustered Age index 16.

In a realistic setting, the number of rows and pages involved would be many orders of magnitude larger than the numbers used in the illustrative example above.

In a data base table of 1,000,000 rows, a query having search criteria which ultimately select two percent (2%) of the rows, and the choice of a sequential table scan, a completely nonclustered index scan, or an index scan which has a degree of clustering of ninety percent (90%), the table's rows being spread over 50,000 data pages and the indexes' entries over 5,000 pages, the following rough estimates of the time required for accessing the table can be made:

| Sequential scan | | |
|---|---|---|
| Data paging = | 50,000 pages @ 2 ms = | 100 sec |
| Processing = | 1,000,000 rows @ 0.1 ms = | 100 sec |
| Total = | | 200 sec |
| Nonclustered index scan | | |
| Index paging = | 2% of 5,000 pages @ 2 ms = | 0.2 sec |
| Data paging = | 2% of 1,000,000 rows × 1 page per row @ 20 ms = | 400 sec |
| Processing = | 2% of 1,000,000 rows @ 0.1 ms = | 2 sec |
| Total = | | 402.2 sec |
| Index scan with 90% clustering | | |
| Index paging = | 2% of 5,000 pages @ 2 ms = | 0.2 sec |
| Clustered data paging = | 90% of 2% of 50,000 pages @ 2 ms = | 1.8 sec |
| Nonclustered data paging I/O = | 10% of 2% of 1,000,000 rows × 1 page per row @ 20 ms = | 40 sec |
| Processing = | 2% of 1,000,000 rows @ 0.1 ms = | 2 sec |
| Total = | | 44 sec |

The optimal access path is clearly through the ninety percent (90%) clustered index. However, prior art methods of access path selection would not have been able to identify this.

DEGREES OF CLUSTERING

In this invention, the "degree of clustering" is defined as the number of clustered rows in a given index divided by the total number of rows in the table. Thus, the degree of clustering is proportional to the number of rows which when in index order is in the same sequence as that sequence in which they are stored.

The number of clustered rows may be determined by performing an index scan through the entire table. A row is considered to be clustered if it is physically stored immediately following the row previously specified by the index. If all rows of an index are clustered according to this definition, then the index is completely clustered as understood in the prior art. If ninety percent (90%) of the table's rows immediately follow their predecessor rows in index order, then according to this invention the index is ninety percent (90%) clustered. This measure of the degree of clustering has been found to be extremely valuable in selecting between indexed access paths into a table.

Access Path Selection Using Degrees of Clustering

The optimizer's task, when presented with a query into a data base table, is to select the fastest access path for that query. The optimizer can choose between a sequential table scan through the entire table, or an index scan using an index corresponding to one of the query's search criteria. Where two or more search criteria have corresponding indexes, the optimizer must choose between these alternative candidate indexes.

Example 1, below, shows a program fragment written in pseudocode (also known as program development language) for determining the fastest indexed access path for a table.

TABLE 1

| Pseudocode Implementation of the Invention | | | | |
|---|---|---|---|---|
| 101 | NR | = | number of rows in the table | |
| 102 | NP | = | number of data pages in the table | |
| 103 | TAR | = | time to do one random page access | |
| 104 | TAS | = | time to do one sequential page access | |
| 105 | TPR | = | time to process one row in the CPU | |
| 106 | DO for each index corresponding to a search criterion in the query | | | * Loop over all<br>* candidate indexes |
| 107 | | NCR | = number of clustered rows in the index | |
| 108 | | DC | = degree of clustering<br>= NCR / NR | * Degree of<br>* clustering |
| 109 | | NLP | = number of leaf pages in the index | |
| 110 | | NL | = number of levels in the index<br>= 1<br>+ number of levels of intermediate pages<br>+ 1 | * (Root page level)<br><br>* (Leaf page level) |
| 111 | | NRI | = number of rows matching the search criterion corresponding to the index | * NRI also equals<br>* the number of<br>* rows to be<br>* processed in the<br>* CPU during the |

TABLE 1-continued
Pseudocode Implementation of the Invention

| | | | | |
|---|---|---|---|---|
| | | | | * index scan |
| 112 | FF | = | filter factor of the index | * Index filter |
| | | = | NRI / NR | * factor |
| 113 | NAR | = | number of random page accesses | * Random accesses |
| | | = | NL | * Walking down the <br> * index |
| | | | + NR × (1−DC) × FF | * Nonclustered rows <br> * (one page access <br> * each) |
| 114 | NAS | = | number of sequential accesses | * Sequential <br> * accesses |
| | | = | NLP × FF | * Scanning the <br> * index leaf pages |
| | | | + NP × FF × DC | * Clustered rows on <br> * adjacent pages |
| 115 | TA | = | total access time required | * Access (paging) <br> * time |
| | | = | NAR × TAR + NAS × TAS | |
| 116 | NRP | = | number of rows processed in CPU | |
| | | = | NR × FF | |
| 117 | TI | = | NRP × TPR | * Processing time |
| 118 | TIME | = | total time for using the index as access path to the table | |
| | | = | TA + TI | * Total time |
| 119 | | SAVE the index's name if it has the shortest total time | | * Save the best <br> * index |
| 120 | END | | | |

The program fragment of Table 1 operates as follows. Lines 101–105 gather information relating to the data base table and to unit times which do not depend on which candidate index is being considered. In line 101, NR stores the total number of rows in the table. In line 102, NP stores the total number of data pages on which the NR rows are stored. In lines 103–104, TAR stores the time required for one random page access, while TAS stores the time required for a sequential page access. TAR is typically much greater than TAS. TPR of line 105 stores the time required for processing one row in the data base system's central processing unit.

The DO-loop between lines 106 and 121 considers in turn each index which corresponds to one of the search criteria in the query presented to the optimizer. The degree of clustering DC is calculated in line 108 by dividing the number of clustered rows NCR for the candidate index by the total number of rows NR in the table. The number of clustered rows NCR may be calculated by performing an index scan through the index under consideration, and counting the number of rows which are physically stored immediately following the row previously accessed during the index scan. This number of clustered rows NCR is preferably calculated and stored once for each index, rather than performing an index scan each time an index's degree of clustering is required to be known.

The number of leaf pages NLP in the index is stored in line 109. Line 110 calculates the number of levels NL in the index. Referring briefly to FIG. 2, the index 26 shown there has three levels: the root page 28 level, one level of intermediate pages 32, and the leaf page 30 level. The number of levels NL is included in the calculation of the number of page accesses required during an index scan, because before the index's leaf pages 30 may be scanned, the index tree 26 must be traversed or "walked" to get to the first leaf page 30 having an index entry 20 satisfying the query's search criterion which corresponds to the index.

The index's filter factor FF is calculated in lines 111–112 as the number of rows NRI matching the selection criterion corresponding to the index divided by the total number of rows NR in the table. The difference between the number of rows NRI matching the index's search criterion and the total number of rows NR reflects the efficiency of accessing only the few rows NRI which match one of the search criteria instead of performing a table scan through all the rows NR of the table, many of which do not match any of the search criteria. The filter factor FF thus corresponds to the index's selectivity in eliminating nonmatching rows during an index scan.

An index scan requires a combination of random and sequential page accesses. As discussed above, random page accesses typically require as much as ten times longer to execute than sequential page accesses, and thus can contribute an inordinately large part of the total time required for an index scan. Random page accesses are required to traverse or walk the index's tree 26, and to access the nonclustered rows scattered over separate data pages 13. The number of random page accesses required to traverse or walk the index's tree 26 is equal to the number of levels NL in the index, calculated above at line 110. The number of page accesses required to access the nonclustered rows is assumed to be equal to the number of nonclustered rows matching the search criterion corresponding to the index. The total number of nonclustered rows in the table is calculated as the total rows in the table NR multiplied by the difference between 1 and the degree of clustering DC for the index. The number of nonclustered rows matching the index's corresponding search criterion is calculated by multiplying the previous sum by the index's filter factor FF. To this is added the number of index levels NL to arrive at the total number of random page access NAR required for the index scan.

The number of sequential page accesses NAS required for the index scan is calculated in line 114. Once the index tree 26 has been traversed, the index leaf pages 30 are accessed in order, requiring sequential page accesses. The number of leaf pages 30 to be accessed during the partial index scan is equal to the total number of leaf pages NLP in the index, multiplied by the index's filter factor FF to reflect the index's selectivity in eliminating nonmatching rows. Sequential page accesses are also used to access the clustered rows lying on adjacent data pages 13. The number of clustered rows to be accessed is equal to the number of data pages 13 which are clustered and which match the search criterion corresponding to the candidate index. The number is calculated as the total number of data pages NP multiplied by both the index's filter factor FF and by the index's degree of clustering DC. The total number of sequential accesses NAS equals the previously calculated product plus the number of index leaf pages to be accessed as described above.

Having calculated the number of random and sequential page accesses NAL, NAS in lines 113-114, the total time required for page accesses is calculated in line 115 by multiplying those numbers by the time required for each. To this is added the total processing time required for the index scan, calculated on lines 116-117, to arrive at the estimated total time TIME for using the index as the access path to the tables for the query. On line 119, the name of the index is saved if its total time TIME is the shortest of the indexes considered so far. After all candidate indexes have been considered in the DO-loop of lines 106-120, the index whose name is currently saved will have the shortest estimated total time TIME, taking into consideration the degrees of clustering of all the candidate indexes. If used as the access path for the query, the index so identified will process the query faster than any of the other candidate indexes. This index's name can then be passed to the optimizer as a significant factor to be used in ultimately selecting the access path for the query.

Numerical Example

To better illustrate the usefulness and advantages of this invention, consider the following comparison of two indexed access paths, one having a sixty percent (60%) degree of clustering DC, and the other a ninety percent (90%) degree of clustering. Remember that in the prior art these indexes would be considered equally nonclustered, and a selection between them would be made arbitrarily.

Assume that the table has 1,000,000 rows (NR = 1,000,000), and that the rows are distributed over 50,000 data pages (NP = 50,000). Assume further that the indexes are equally selective, having a filter factor of two percent (FF = 2%). Further, assume that each index has 5,000 leaf pages (NLP = 5,000) in a tree of five levels (NL = 5). Finally, assume that a random page access requires twenty milliseconds (TAR = 20 ms), a sequential page access requires two milliseconds (TAS = 2 ms), and the time to process one row equals 0.1 milliseconds (TR = 0.1 ms).

The estimated total time TIME incurred by using each index as the access path is then calculated as follows:

EXAMPLE 1

| | | | Comparison of 60% and 90% Clustered Indexes | | |
|---|---|---|---|---|---|
| | | | | 60% Index | 90% Index |
| 101 | NR | = | 1,000,000 rows | | |
| 102 | NP | = | 50,000 data pages | | |
| 103 | TAR | = | 20 ms | | |
| 104 | TAS | = | 2 ms | | |
| 105 | TPR | = | 0.1 ms | | |
| 107 | NCR | = | | 600,000 rows | 900,000 rows |
| 108 | DC | = | | 60% | 90% |
| 109 | NLP | = | | 5,000 leaf pg. | 5,000 lv. |
| 110 | NL | = | | 5 levels | 5 levels |
| 111 | NRI | = | | 20,000 rows | 20,000 rows |
| 112 | FF | = | | 2% | 2% |
| 113 | NAR | = | NL + NR×(1−DC)×FF = | 8,005 ran. acc. | 2,005 acc. |
| 114 | NAS | = | NLP×FF + NP×FF×DC = | 700 seq. acc. | 1,000 acc. |
| 115 | TA | = | NAR×TAR + NAS×TAS = | 161.5 seconds | 42.1 seconds |
| 116 | TI | = | TPR × NRI = | 2 seconds | 2 seconds |
| 117 | TIME | = | TA + TI = | 163.5 seconds | 44.1 seconds |

The four-fold improvement in performance, i.e., the seventy-five percent (75%) reduction in total time, achieved by using the ninety percent (90%) clustered index as the access path to the table is entirely due to the large reduction in the number of random page accesses required for the more tightly clustered rows. As seen on line 113 of Example 1, the sixty percent (60%) clustered index will require 8,005 random page accesses. The ninety percent (90%) clustered index requires only 2,005 random accesses, a seventy-five percent (75%) reduction over the sixty percent (60%) clustered index, and at a cost of only 300 additional sequential page accesses. Even if sequential page accesses were not ten times faster than random accesses, this tradeoff would be worth making. However, until now access path optimizers have been unable to identify the time savings obtainable by using relatively more clustered indexes.

These time savings can be substantial, as witnessed by the seventy-five percent (75%) reduction in the total time required to process the query achieved by using the index having the higher degree of clustering.

It will be appreciated that, although specific implementation of this invention has been described above for purposes of illustration, various modifications and extensions may be made without departing from the spirit and scope of the invention. For example, the degree of clustering can be calculated not simply as the ratio of clustered rows to total rows, but might include a multiplier greater than 1 to account for the advantage of sequentially accessing nonadjacent rows which are nevertheless on adjacent or nearby data pages. Such a multiplier would more accurately reflect the true value of using an index with a degree of clustering.

It will be understood that this invention is not limited to relational data base queries, but can be readily applied to optimizing the access paths in joining relational data base tables. Further, the invention is considered to have value outside the field of relational data base management systems, in the broader realm of estimating page accesses in other data processing applications. It will be understood that outside the area of relational data bases, there is data commonly considered to be stored in "records", and other structures (analogous to the indexes described above) are used to access the records in sequences other than that in which they were stored. Accordingly, the scope and protection of the invention is not limited except as by the following claims.

We claim:

1. A method for operating a data processing system having a processing unit and a physical storage device in which a plurality of pages of data are stored in a physical sequence wherein each page other than a last page has a sequential page which follows it, the physical storage device being operably connected to the processing unit for transferring pages of data to the processing unit, the physical storage device containing a data base table which is stored on a plurality of pages, the data base table having a plurality of rows of data and a plurality of indexes composed of a sequence of entries which reference the rows, the method comprising the steps performed by the processing unit of:
   (a) obtaining a data base operation command specifying search criteria;
   (b) selecting a plurality of indexes which correspond to the search criteria;
   (c) determining a degree of clustering for each selected index which is calculated by dividing the number of clustered rows referenced in the selected index by the number of rows in the data base table, clustered rows being those rows which are stored in the physical storage device in the same page or a sequential page of the physical storage device as the row referenced by the preceding entry in the index, divided by the total number of rows in the table, wherein the degree of clustering is directly proportional to the number of rows referenced by the selected index which are stored on a page of the physical storage device which is the same page on which the row referenced by the preceding index entry is stored;
   (d) determining, using the degree of clustering for each selected index and the search criteria, a total expected time required for transferring the pages from the physical storage device if the selected index is used to specify the order in which to transfer the pages from the physical storage device; and
   (e) transferring the pages containing the rows of the data base table from the physical storage device to the processing unit in the sequence specified in the selected index having the lowest total expected time from step (d), thereby obtaining the data matching the search criteria in an efficient manner.

2. The method of claim 1, wherein step (d) further comprises the steps of:
   (a) determining an expected time required for a number of random page transfers;
   (b) determining an expected time required for a number of sequential page transfers; and
   (c) including the times from steps (a) and (b) in the total expected time.

3. The method of claim 1, wherein the total expected time determined in step (d) is proportional to a filter factor which is computed by dividing the number of rows in the selected index which correspond to a search criterion by the total number of rows in the data base table.

4. The method of claim 1, wherein the index are stored on the physical storage device and wherein the total expected time includes the time required for transferring the index pages form the physical storage device.

5. The method of claim 4, wherein the time required for transferring the index pages is based on the number of levels of the selected index.

6. The method of claim 1, wherein the step for determining the degree of clustering further includes the step of reading a previously calculated degree of clustering for the selected index from the physical storage device.

7. A method for operating a data processing system having a processing unit and a physical storage device in which a plurality of pages of data are stored in a physical sequence wherein each page other than a last page has a next sequential page which follows it, the physical storage device being operably connected to the processing unit for transferring pages of data to the processing unit and containing a data base table which is stored on a plurality of pages, the data base table having a plurality of rows of data and a plurality of indexes composed of a sequence of entries which reference the rows, the method comprising the steps performed by the processing unit of:
   (a) selecting a plurality of indexes referenced in a specified set of search criteria;
   (b) determining a degree of clustering for each selected index, the degree of clustering being equal to the number of rows referenced by the selected index which when considered in index order are stored on the same page or the next sequential page of the physical storage device as the row referenced by the preceding entry in the index, divided by the total number of rows in the table;
   (c) estimating, for each selected index, using the search criteria, a number of random page transfers expected if the selected index is used to determine the order in which to transfer the pages from the physical storage device, the estimating step including the use of a formula including the computation term $NR \times (1-DC)$ where NR is the total number of rows in the data base table and DC is the degree of clustering;

(d) estimating, for each selected index, using the search criteria, a number of sequential page transfers expected if the selected index is used to determine the order in which to transfer the pages from the physical storage device, the estimating step including the use of a formula including the computational term $$NP \times DC$$

where NP is the total number of pages of data in the data base table and DC is the degree of clustering;

(e) calculating a total expected transfer time for each selected index, using the product of the estimated number of random page transfers and a time value which estimates the time required to perform one random page transfer and the product of the estimated number of sequential page transfers and a time value which estimates the time required to perform one sequential page transfer; and (f) transferring the pages containing the rows of the data base table from the physical storage device to the processing unit in the sequence specified in the selected index having the lowest total expected transfer time, thereby obtaining the data matching the search criteria.

8. The method of claim 7, wherein the formula used in the estimating step for the number of random page transfers includes a computation term based on the depth of the selected index.

9. The method of claim 7, wherein the formula used in the estimating step for the number of sequential page transfers includes a computation term based on the number of leaf pages int eh selected index.

10. The method of claim 7, wherein the time calculated in step (e) includes an estimate of time required to process each row.

11. The method of claim 7, each row, other than a first row, referenced in each index having a preceding row, the step for determining a degree of clustering further comprising the steps of:

(a) establishing for each row referenced in the selected index an associated page in the physical storage device on which the row is stored;

(b) counting, for each row referenced in the selected index having a preceding row, the rows having an associated page which is equal to the page associated with the preceding row, thereby determining a first count;

(c) counting, for each row referenced in the selected index having a preceding row, the rows having an associated page which is the page which next sequentially follows the page associated with the preceding row, thereby determining a second count;

(d) adding the first count and the second count to get a total count; and (e) dividing the total count by the total number of rows in the table, thereby determining the degree of clustering.

* * * * *